US 10,801,411 B2

(12) United States Patent
Suciu et al.

(10) Patent No.: US 10,801,411 B2
(45) Date of Patent: Oct. 13, 2020

(54) CERAMIC LINER FOR A TURBINE EXHAUST CASE

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: Raytheon Technologies Corporation, Farmington, CT (US)

(*) Notice: Subject to any disclaimer, the term of this patent is extended or adjusted under 35 U.S.C. 154(b) by 739 days.

(21) Appl. No.: 14/917,396

(22) PCT Filed: Aug. 19, 2014

(86) PCT No.: PCT/US2014/051600
§ 371 (c)(1),
(2) Date: Mar. 8, 2016

(87) PCT Pub. No.: WO2015/069358
PCT Pub. Date: May 14, 2015

(65) Prior Publication Data
US 2016/0215699 A1 Jul. 28, 2016

Related U.S. Application Data

(60) Provisional application No. 61/876,322, filed on Sep. 11, 2013.

(51) Int. Cl.
*F02C 7/20* (2006.01)
*F02K 1/82* (2006.01)
(Continued)

(52) U.S. Cl.
CPC ............... *F02C 7/20* (2013.01); *F01D 25/26* (2013.01); *F01D 25/28* (2013.01); *F02K 1/822* (2013.01);
(Continued)

(58) Field of Classification Search
CPC . F02C 7/20; B64D 33/04; F01D 25/24; F01D 25/26; F01D 25/28; F01D 25/30;
(Continued)

(56) References Cited

U.S. PATENT DOCUMENTS 4,643,636 A 2/1987 Libertini et al.
4,786,232 A 11/1988 Davis et al.
(Continued)

FOREIGN PATENT DOCUMENTS

| EP | 0344877 | 12/1989 |
| JP | 304084 | 11/1999 |
| WO | 2008069705 | 6/2008 |

OTHER PUBLICATIONS

International Preliminary Report on Patentability for PCT Application No. PCT/US2014/051600 completed Mar. 15, 2016.
(Continued)

*Primary Examiner* — Gerald L Sung
*Assistant Examiner* — Stephanie Cheng
(74) *Attorney, Agent, or Firm* — Carlson, Gaskey & Olds, P.C.

(57) ABSTRACT

A gas turbine engine includes a core engine including a central engine axis and a nacelle surrounding the core engine. At least a portion of the nacelle is axially movable relative to the core engine between open and fully closed positions. A ceramic-based liner is located at an aft portion of the core engine. The ceramic-based component mechanically interfaces with the movable portion of the nacelle when the nacelle is in the fully closed position. A turbine section and a method of accommodating thermally-induced dimensional change of engine components are also disclosed.

15 Claims, 4 Drawing Sheets

(51) Int. Cl.
*F01D 25/28* (2006.01)
*F01D 25/26* (2006.01)

(52) U.S. Cl.
CPC .. *F05D 2300/20* (2013.01); *F05D 2300/6033* (2013.01); *Y02T 50/672* (2013.01); *Y02T 50/675* (2013.01)

(58) Field of Classification Search
CPC ........ F01D 25/305; F01D 25/285; F02K 1/04; F02K 1/78; F02K 1/80; F02K 1/805; F02K 1/82; F02K 1/822; F02K 1/08; F02K 1/09; F02K 1/52; F02K 1/825; F02K 1/566; F05D 2230/64; F05D 2230/642; F05D 2230/72; F05D 2230/80; F05D 2250/30; F05D 2250/02; F05D 2240/90; F05D 2230/60; F05D 2230/61; F05D 2230/70
See application file for complete search history.

(56) References Cited

U.S. PATENT DOCUMENTS

| | | | |
|---|---|---|---|
| 6,733,233 B2 | 5/2004 | Jasklowski et al. | |
| 6,884,026 B2 | 4/2005 | Glynn et al. | |
| 6,932,566 B2 | 8/2005 | Suzumura et al. | |
| 7,208,230 B2* | 4/2007 | Ackerman | C23C 28/322 416/241 B |
| 7,771,160 B2 | 8/2010 | Shi et al. | |
| 8,167,546 B2 | 5/2012 | Shi et al. | |
| 8,726,665 B2* | 5/2014 | Moore | F02K 1/386 60/725 |
| 2003/0161716 A1* | 8/2003 | Nguyen | F01D 9/065 415/1 |
| 2004/0118127 A1 | 6/2004 | Mitchell et al. | |
| 2005/0271505 A1 | 12/2005 | Alford et al. | |
| 2010/0068034 A1* | 3/2010 | Schiavo | F01D 5/189 415/115 |
| 2011/0167785 A1 | 7/2011 | Moore et al. | |
| 2011/0185735 A1 | 8/2011 | Snyder | |
| 2012/0027572 A1 | 2/2012 | Denece et al. | |
| 2012/0156029 A1 | 6/2012 | Karafillis et al. | |
| 2012/0198815 A1* | 8/2012 | Suciu | F02K 3/075 60/226.3 |
| 2012/0297791 A1 | 11/2012 | Suciu et al. | |
| 2012/0301269 A1 | 11/2012 | Alvanos et al. | |
| 2012/0308367 A1 | 12/2012 | Luczak | |
| 2013/0000324 A1 | 1/2013 | Alvanos et al. | |
| 2013/0094951 A1 | 4/2013 | McCaffrey | |
| 2013/0156556 A1 | 6/2013 | Franks et al. | |
| 2013/0192233 A1 | 8/2013 | Eastwood et al. | |
| 2014/0286763 A1* | 9/2014 | Munshi | F02C 7/12 415/178 |

OTHER PUBLICATIONS

The International Search Report and Written Opinion for PCT Application No. PCT/US2014/051600, dated May 27, 2015.
European Search Report for European Patent Application No. 14860946.4 completed Apr. 5, 2017.

* cited by examiner

CERAMIC LINER FOR A TURBINE EXHAUST CASE

CROSS-REFERENCE TO RELATED APPLICATION

This application claims priority to U.S. Provisional Application No. 61/876,322, filed Sep. 11, 2013.

BACKGROUND

This disclosure relates to a ceramic liner for maintaining axial alignment of core portions of a gas turbine engine.

A core engine typically includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive at least the compressor. The compressor section typically includes low and high pressure compressors, and the turbine section includes low and high pressure turbines. Some gas turbine engines include a fan section driven by the turbine section. Some gas turbine engines may include one or more shafts on which the engine components are arranged, such as a low shaft and a high shaft. The core engine is arranged in a nacelle.

The core engine is surrounded by a series of cases, which cover the various sections (or modules) of the core engine. Since inner portions of the turbine and compressor sections are rotating, these modules are typically surrounded by an outer casing which is not structural. To add stability to the structure, the core engine will also include two or more structural frames. The turbine section is almost always followed by a structural frame known as a turbine exhaust case (TEC). This structural frame is required to supports rear bearings of the low shaft. The TEC is typically composed of an inner ring and an outer ring, which are connected by aerodynamic struts. In some configurations inner and outer rings are contoured to form an inner and outer lining of a flow path for air exiting the turbine section, or in some examples, specifically for air exiting a low pressure turbine (LPT).

Since the exhaust from the LPT must pass between the inner and outer rings, the struts are also contoured in an aerodynamic manner to allow the air to pass through in an efficient manner, and also turn the air in the direction it needs to go. In some engine configurations, the mounting brackets for the engine are attached to the turbine exhaust case, and the mounting forces are transferred directly from the outer case structure, through the aerodynamic struts, and down to the bearings that support the low shaft of the engine.

The metallic case structure of the core engine will expand and shrink in both the axial and radial direction as the temperature of the material changes during engine operation. This will make it impossible for the case structure to maintain alignment with the nacelle structure, if the nacelle is composed of composite materials which will experience very little expansion.

SUMMARY

A gas turbine engine according to an example of the present disclosure includes a core engine including a central engine axis, a core engine nacelle surrounding the core engine, wherein at least a portion of the nacelle is axially movable relative to the core engine between open and fully closed positions, and a ceramic-based liner at an aft portion of the core engine, wherein the ceramic-based liner mechanically interfaces with the movable portion of the nacelle when the nacelle is in the fully closed position.

In a further embodiment of the foregoing embodiment, the core engine includes a turbine section, the turbine section including a plurality of blades surrounded by a turbine case, and the ceramic-based liner is arranged aft of the plurality of blades.

In a further embodiment of any of the foregoing embodiments, the turbine section includes a turbine exhaust case arranged aft of the plurality of blades, and the ceramic-based liner is arranged inside the turbine exhaust case.

In a further embodiment of any of the foregoing embodiments, the ceramic-based liner includes a ceramic matrix composite material.

In a further embodiment of any of the foregoing embodiments, the ceramic-based liner is supported on a support structure, the support structure arranged between the core engine and the nacelle.

In a further embodiment of any of the foregoing embodiments, the ceramic-based liner floats with radial play on the support structure.

In a further embodiment of any of the foregoing embodiments, at least one of the nacelle and the ceramic-based liner includes a locking feature to reversibly connect the nacelle and the ceramic-based liner.

A turbine section for a gas turbine engine according to an example of the present disclosure includes a turbine, an inner liner, and an outer liner aft of the turbine, wherein at least one of the inner and outer liners floats with radial play on a support structure.

In a further embodiment of any of the foregoing embodiments, the support structure is a strut arranged between the inner and outer liners.

In a further embodiment of any of the foregoing embodiments, at least one of the inner and outer liners includes an aperture to receive the strut in a slip-fit relationship.

In a further embodiment of any of the foregoing embodiments, the support structure includes a fairing.

In a further embodiment of any of the foregoing embodiments, the inner liner floats with radial play on the support structure.

In a further embodiment of any of the foregoing embodiments, the inner liner includes a ceramic-based material.

In a further embodiment of any of the foregoing embodiments, the outer liner includes a metallic material.

In a further embodiment of any of the foregoing embodiments, the turbine section further includes a plurality of vanes, and the inner liner is arranged aft of the plurality of vanes.

A method of accommodating thermally-induced dimensional change of engine components according to an example of the present disclosure includes operating a gas turbine engine such that a core engine section undergoes a thermally-induced dimensional change, providing a core engine nacelle surrounding the core engine section and configured to move relative to the core engine section, providing a ceramic liner on an aft portion of the core engine, the ceramic component configured to mechanically interface with the nacelle, and accommodating the dimensional change of the core engine sections using the ceramic liner such that the axial alignment of the core engine section and the nacelle is maintained.

In a further embodiment of any of the foregoing embodiments, the ceramic-based liner includes a ceramic matrix composite material.

In a further embodiment of any of the foregoing embodiments, the ceramic liner accommodates the dimensional change of the core engine by moving radially.

In a further embodiment of any of the foregoing embodiments, the core engine section includes a turbine, and the turbine includes a turbine exhaust case which undergoes the thermally-induced dimensional change.

In a further embodiment of any of the foregoing embodiments, the ceramic-based liner is inside the turbine exhaust case.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
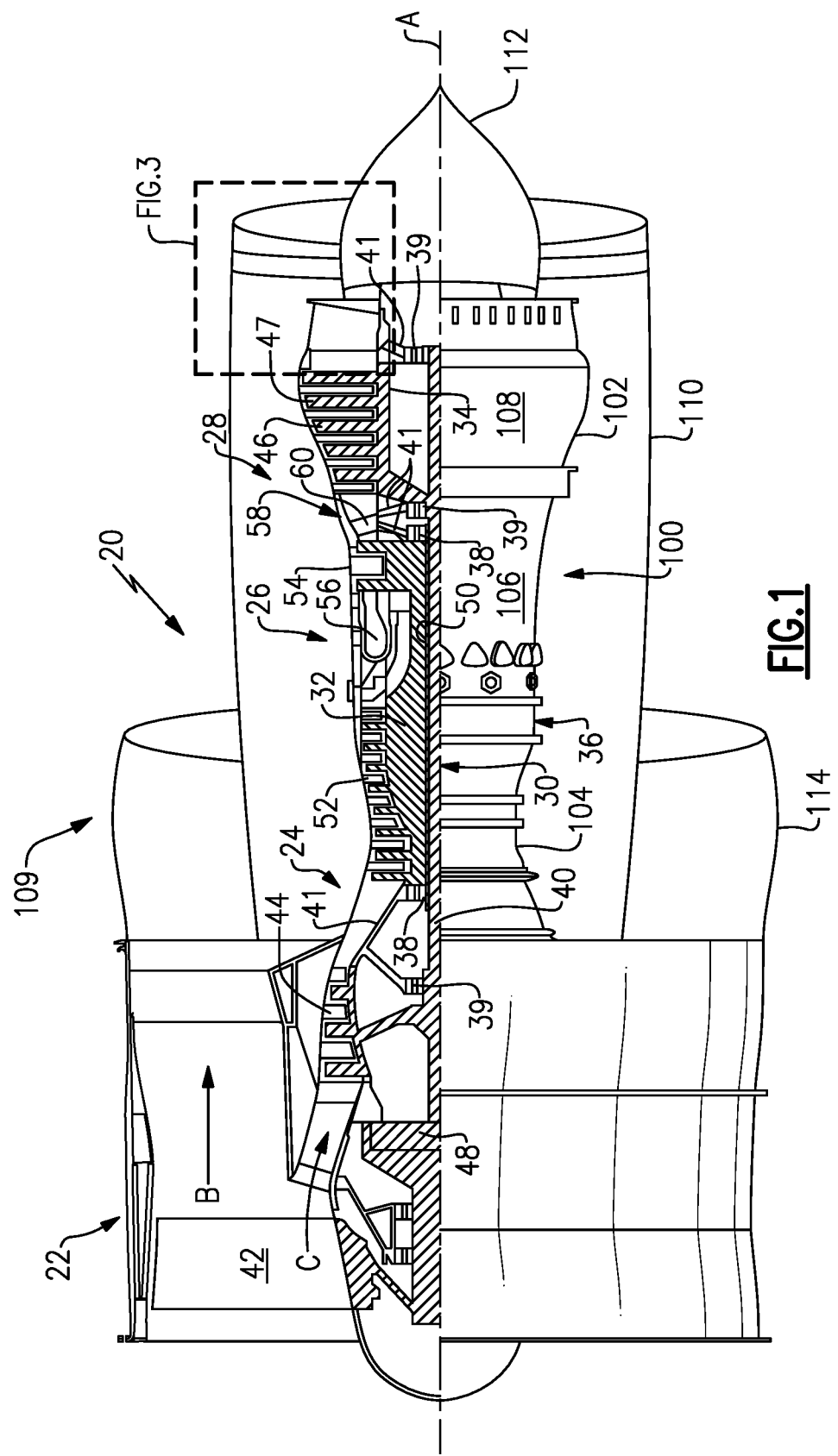
FIG. 1 schematically illustrates an example gas turbine engine including a nacelle structure in a fully closed position.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38, 39. It should be understood that various bearing systems 38, 39 at various locations may alternatively or additionally be provided.

The low speed spool 30 generally includes an inner shaft 40, that connects a fan 42 and a low pressure compressor section 44 to a low pressure turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38, 39 joined to each of the outer and inner shafts 50, 40, respectively, about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38, 39 in the turbine section 28 as well as setting airflow entering the low pressure turbine 46.

The core airflow flowpath C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by air in the bypass flowpath B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency. The example low pressure turbine 46 includes a plurality of rotating blades 47.

The compressor section 24, combustor section 26, and turbine section 28 make up a core engine 100. The core engine 100 includes a core engine case 102. The core engine case 102 can be discontinuous. That is, the core engine case 102 can include a compressor section case 104, a combustor section case 106, and a turbine section case 108. The compressor section case 104, combustor section case 106, and turbine section case 108 can be arranged serially. The portions 104, 106, 108 of the core engine case 102 can be metallic.

Figure 2:
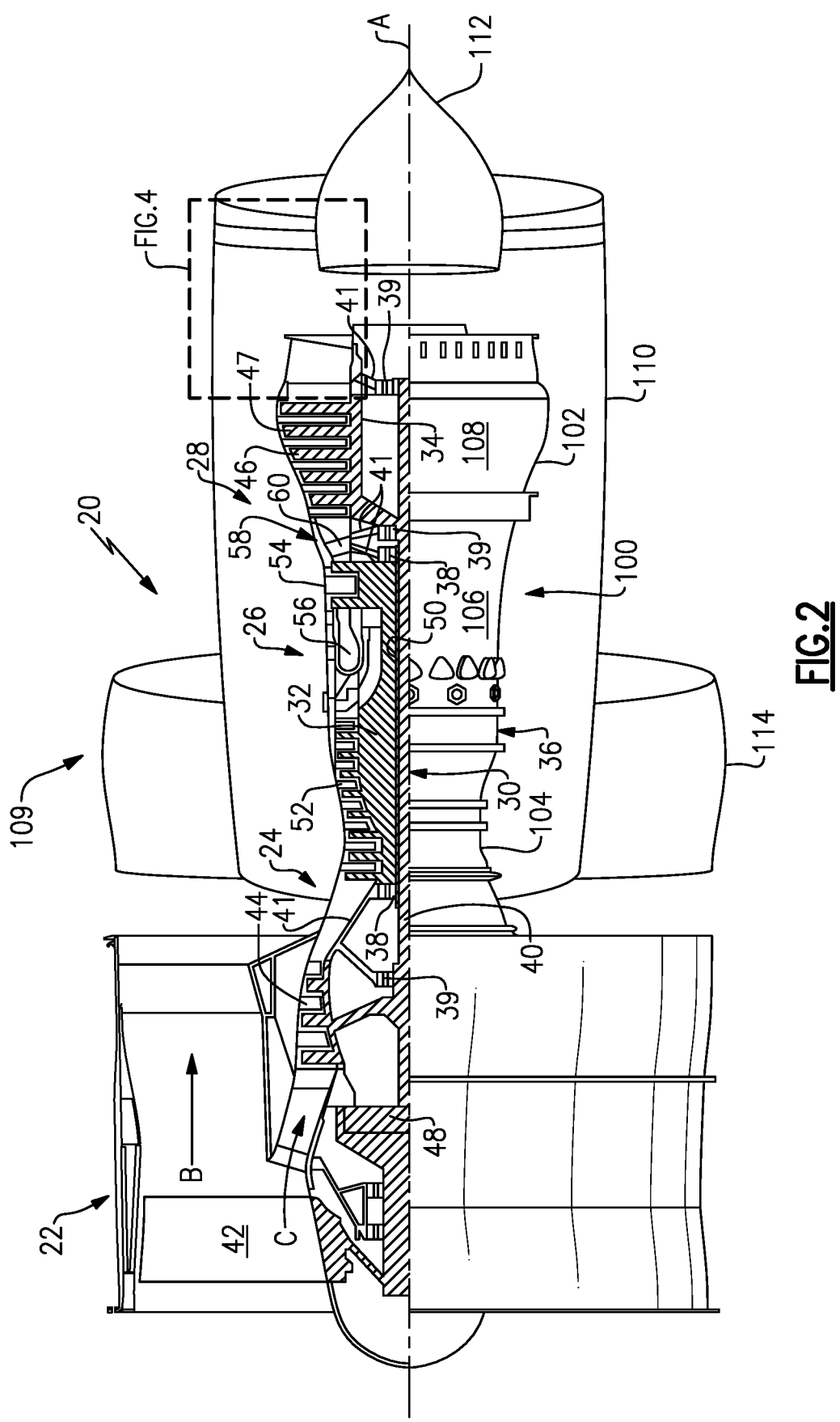
FIG. 2 schematically illustrates the example gas turbine engine of FIG. 1 with the nacelle structure in an open position.

Referring to FIGS. 1-2, a nacelle structure 109 includes a core engine nacelle 110, a core engine nacelle plug 112, and an outer nacelle 114. The core engine nacelle 110 surrounds the core engine 100 and core engine case 102. The plug 112 can be arranged at an aft end of the core engine nacelle 110. The outer nacelle 114 surrounds a forward end of the core engine nacelle 110. An aft portion of the nacelle structure 109 is movable relative to the core engine 100 to allow for access to core engine 100 components. FIG. 1 shows the nacelle structure 109 in a fully closed position, and FIG. 2 shows the nacelle structure 109 in an open position.

Figure 3:
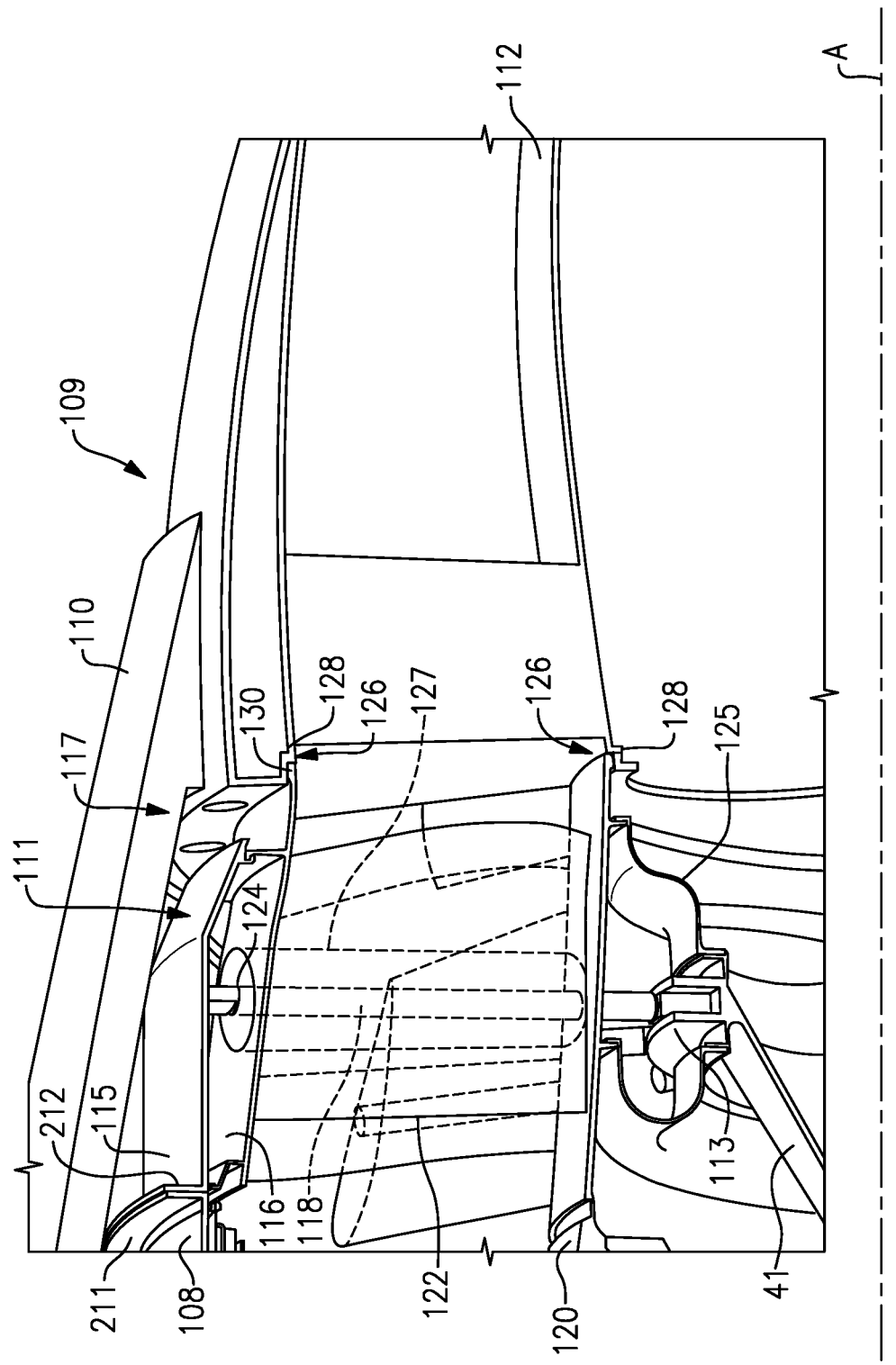
FIG. 3 illustrates a close-up view of an aft section of the gas turbine engine of FIG. 1.
Figure 4:
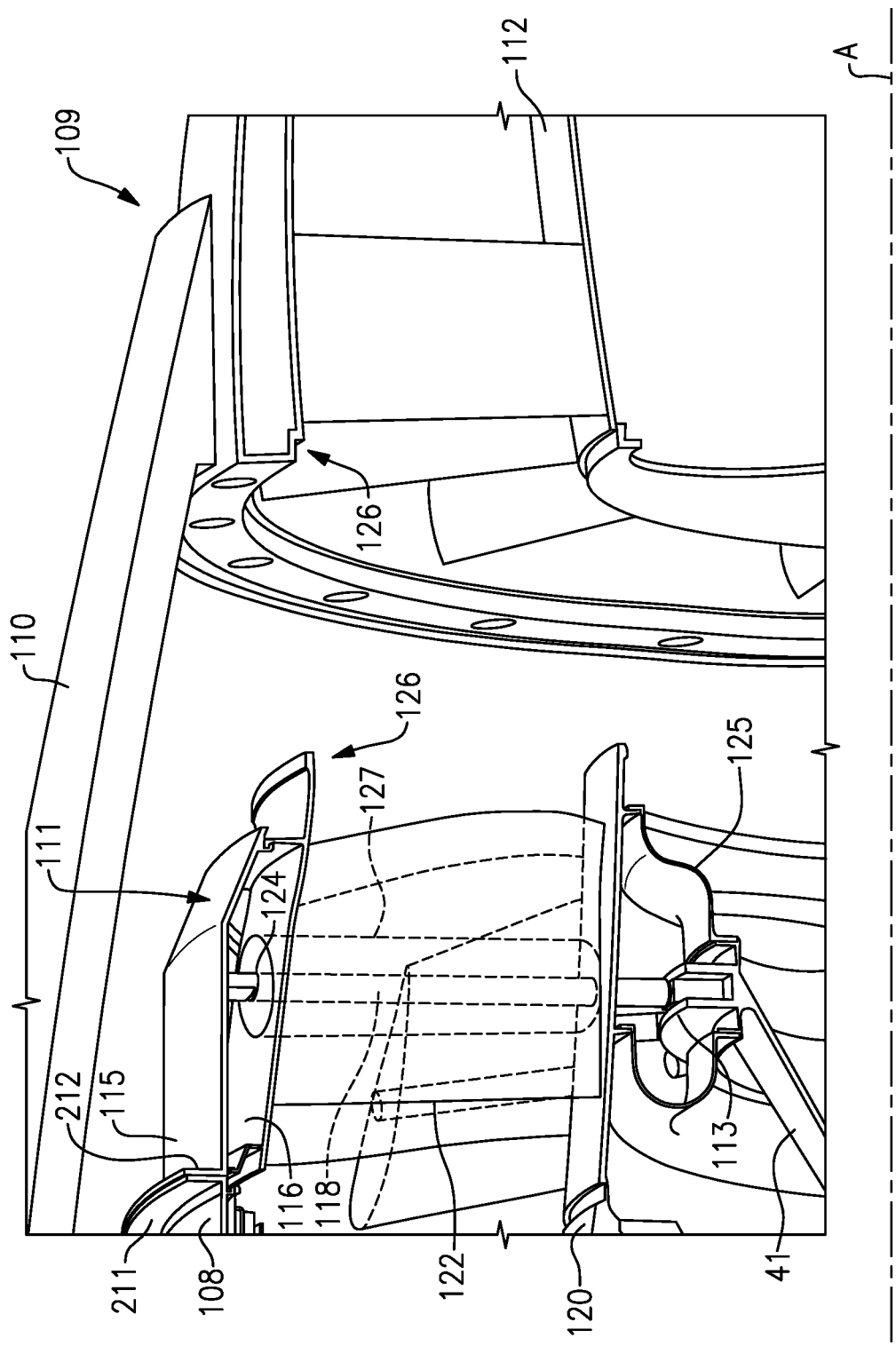
FIG. 4 illustrates a close-up view of an aft section of the gas turbine engine of FIG. 2.

FIGS. 3-4 show an aft end of the turbine section 28 including the turbine section case 108 and a turbine exhaust case (TEC) 111 which is located aft of the rotating blades 47 in the low pressure turbine 46 (FIGS. 1-2) and the turbine section case 108. In one example, the turbine section case 108 and the TEC 111 each include flanges 211, 212, which are mated to one another. FIG. 3 shows the nacelle structure 109 in the fully closed position, and FIG. 4 shows the nacelle structure 109 in the open position. The TEC 111 is a structural frame which supports the bearing systems 39 for the inner shaft 40 (FIGS. 1-2) via a bearing support 41 and to which engine 20 mounts (not shown) are typically attached.

In the example engine 20 of FIGS. 3-4, the TEC 111 includes inner and outer structural rings 115, 113. The inner and outer structural rings 115, 113 are connected by a structural rod 118 which carries a load between the inner and outer structural rings 115, 113. Forces that are applied to the outer ring 115 are transferred through the structural rod 118 and to the inner ring 113, bearing support 41, inner shaft 40, and bearing systems 39 (FIGS. 1-2). An aerodynamic fairing 122 surrounds the structural rod 118.

In the engine 20 of FIGS. 1-4, the inner and outer liners 120, 116 and the aerodynamic fairing 122 that connects them make up the floating portion of the structure. They are connected to the inner structural ring 113 through a flexible connection 125. The floating portion is not structural. Instead, the inner and outer structural rings 113, 115 of the turbine section 28 are independent from the inner and outer liners 120, 116.

The structural rods 118 pass through a hollow cavity 127 in the floating aerodynamic fairing 122 in a slip-fit relationship to allow for axial and radial movement of the floating portion with respect to the core engine axis A. The structural rods 118 also pass through an aperture 124 in the outer liner 116 in a slip-fit relationship. The fairings 122 and the inner and outer liners 120, 116 of the TEC 111 direct the air flow out of the low pressure turbine 46, allowing them to pass around the structural rods 118 in an efficient manner. The inner and outer liners 120, 116, and the fairing 122 that connects them, are not firmly attached to the structural components of the TEC 111, but are permitted to "float" to some degree with radial play on the structural rods 118.

The floating portion of the structure, consisting of the inner liner 120, the aerodynamic fairing 122, and the outer liner 116 is ceramic-based. The ceramic-based outer liner 116, in one example, is a ceramic matrix composite (CMC) material. Possible CMC materials, which may include a first matrix phase and a second phase dispersed in the first matrix phase, may include, but are not limited to various combinations of silicon carbide (SiC) and carbon (C) for the first/second phase materials, such as SiC/SiC, SiC/C or C/SiC. The CMC material used in the floating portion of the TEC 111 would have similar properties to the material used in the sliding nacelle 109; therefore, these components would experience the same degree of thermal expansion during engine 20 operation.

The outer liner 116 mates with the sliding nacelle structure 109 at a mechanical interface 117 when the nacelle structure 109 is in the fully closed position. In one example, the outer liner 116 mechanically interfaces with the nacelle structure 109 by abutting the nacelle structure 109. In another example, the ceramic-based liner 116 and the nacelle structure 109 may mechanically interface by interlocking. The ceramic-based liner 116, the nacelle structure 109, or both can include a locking feature 126 to reversibly connect the nacelle structure 109 to the ceramic-based liner 116 when the nacelle structure 109 is in the fully closed position. For instance, the plug 112 and/or the core engine nacelle 110 may include a step 128 to limit radial movement of the nacelle structure 109 with respect to the ceramic-based liner 116 or the inner turbine liner 120. The ceramic-based liner 116 may include a lip 130 to mate with the step 128.

During operation of the engine 20, the metallic core engine case 102 and structural components of the TEC 111 can experience thermally-induced dimensional changes caused by temperature fluctuations during operation of the engine 20. This can cause the metallic structural components of the TEC 111 to fall out of axial and radial alignment with the sliding nacelle structure 109. The floating ceramic-based outer liner 116 is less prone to dimensional changes than the metallic structural components of the TEC 111. Therefore, the floating ceramic-based liner 116 accommodates, or in essence mitigates, the dimensional changes of the metallic structural components of the TEC 111 by moving radially to maintain alignment of the TEC 111 and the sliding nacelle structure 109.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine, comprising:
a core engine including a central engine axis;
a core engine nacelle surrounding the core engine, wherein at least a portion of the core engine nacelle is axially movable relative to the core engine between open and fully closed positions;
a core engine case arranged within the core engine nacelle, the core engine case including an inner structural ring and an outer structural ring connected by a support structure;
a ceramic-based inner liner and a ceramic-based outer liner arranged within the core engine case, the inner liner connected to the inner structural ring via a flexible connection, wherein the flexible connection is flexible in a radial direction so that the inner liner floats with radial play on the support structure through the flexible connection, wherein the outer liner interlocks with the movable portion of the nacelle when the nacelle is in the fully closed position.

2. The gas turbine engine of claim 1, wherein the core engine includes a turbine section, the turbine section including a plurality of blades surrounded by a turbine case, and the ceramic-based inner liner and the ceramic-based outer liner are arranged aft of the plurality of blades.

3. The gas turbine engine of claim 2, wherein the turbine section includes a turbine exhaust case arranged aft of the plurality of blades, and the ceramic-based inner liner and the ceramic-based outer liner are arranged inside the turbine exhaust case.

4. The gas turbine engine of claim 1, wherein at least one of the ceramic-based inner liner and the ceramic-based outer liner includes a ceramic matrix composite material.

5. The gas turbine engine of claim 1, wherein the core engine case includes a turbine section case that surrounds a turbine and a turbine exhaust case aft of the turbine section case, and wherein the turbine exhaust case includes the inner and outer structural rings.

6. The gas turbine engine of claim 5, wherein the inner liner and the outer liner are arranged within the turbine exhaust case.

7. A turbine section for a gas turbine engine, comprising:
a turbine;
a turbine exhaust case aft of the turbine, the turbine exhaust case including an inner structural ring and an outer structural ring connected by a support structure;
an inner liner and an outer liner arranged within the turbine exhaust case, the inner liner connected to the inner structural ring via a flexible connection, wherein the flexible connection is flexible in a radial direction so that the inner liner floats with radial play on the support structure through the flexible connection; and
a fairing surrounding the support structure.

8. The turbine section of claim 7, wherein the support structure is a strut that extends through the inner liner and the outer liner.

9. The turbine section of claim 8, wherein the outer liner includes an aperture to receive the strut in a slip-fit relationship.

10. The turbine section of claim 8, wherein the inner liner includes an aperture to receive the strut in a slip-fit relationship.

11. The turbine section of claim 10, wherein the outer liner and the fairing float with radial play on the strut.

12. The turbine section of claim 7, wherein the inner liner includes a ceramic-based material.

13. The turbine section of claim 12, wherein the outer liner includes a ceramic-based material.

14. The turbine section of claim 13, wherein the turbine exhaust case is metallic.

15. The turbine section of claim 7, further comprising a plurality of vanes, and wherein the inner liner and inner structural ring are arranged aft of the plurality of vanes.

* * * * *